United States Patent [19]
Luebkeman

[11] 3,912,400
[45] Oct. 14, 1975

[54] MOLDED BINOCULAR GUN SIGHT LENS STRUCTURE

[75] Inventor: George C. Luebkeman, Cleves, Ohio

[73] Assignee: W. R. Weaver Company, El Paso, Tex.

[22] Filed: Jan. 31, 1974

[21] Appl. No.: 438,359

[52] U.S. Cl. .................... 356/247; 33/241; 33/243; 350/175 NG; 350/178
[51] Int. Cl.² ...................... G01C 9/02; G01C 9/12
[58] Field of Search ...... 356/247, 251; 350/10, 178, 350/175 NG; 33/241, 242, 243

[56] References Cited
UNITED STATES PATENTS
3,362,074  1/1968  Luebkeman et al. ............... 356/247
FOREIGN PATENTS OR APPLICATIONS
1,227,209  4/1971  United Kingdom .................. 350/10

Primary Examiner—Vincent P. McGraw

[57] ABSTRACT

A lens structure for binocular sighting of firearms and other sighted devices having an axially elongated, plano-convex body made of transparent molded material. The body includes a minute depression formed in the planar surface on the optical axis of the lens, the bottom of the depression being located on the focal point of the lens. A spot producing material is disposed in the bottom of the depression whereby when the lens structure is positioned on the muzzle end of the barrel of a firearm or mounted on other sighted devices it will provide a collimated image of the spot directed to a restricted lateral area of the positioned aiming eye of the user of the firearm or other sighted device.

4 Claims, 5 Drawing Figures

U.S. Patent  Oct. 14, 1975  3,912,400
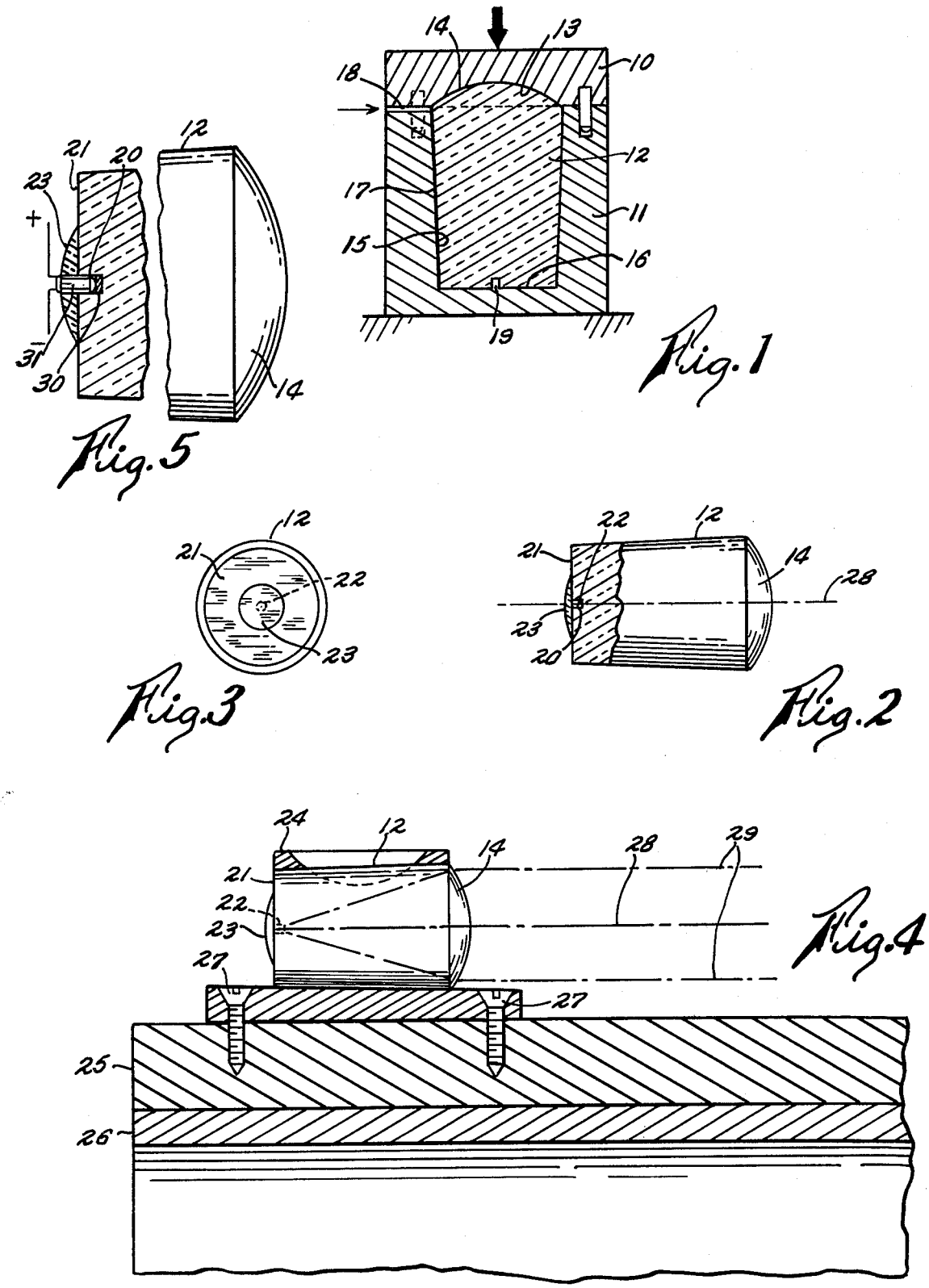

3,912,400

MOLDED BINOCULAR GUN SIGHT LENS STRUCTURE

The present invention relates to improvements in lens structures incorporated in binocular front sights to be mounted on firearms at the positions usually occupied by conventional bead or bar sights and on other sighted devices. My binocular front sight is adapted to take the place of said conventional bead or bar sights and their contours must have substantially the same outlines as the conventional sights even though said binocular sights have structural parts that must be separately made and accurately assembled.

So called binocular front sights for firearms similar to the sights disclosed in my U.S. Pat. No. 3,362,074, granted Jan. 9, 1968, are adapted to direct a collimated image of a minute, colored spot on the sight into a laterally restricted area at the breach end of the firearm where the image is sensed by the aiming eye of a shooter using binocular vision to indicate the correct line of sight on a moving target while the non-aiming eye is not attracted to the sight because it is outside said restricted area.

Because of the minute sizes and designs of these binocular gun sight lenses which are of a plano-convex character, great difficulty has been encountered in precisely locating their optical axes and focal points and then applying a minute, precisely contoured spot on the planar surfaces of the lenses at the conjunctions of the optical axes and focal points so located. The manufacturing holder or jig for these plano-convex lenses required much time consuming adjustments to locate these optical axes and focal points and the application of the minute dots on the planar faces was not always precise or properly contoured and when applied said lenses were quite often rejected as unsatisfactory to project a laterally restricted and collimated, colored image from the sight that is required for precise binocular shooting.

It is therefore an object of the invention to provide a molded lens construction that is made from transparent, glass or transparent plastic materials and which has a depression formed during the molding operation located in the planar surface and on the optical axis of the plano-convex lens and with the bottom of the depression positioned on the focal point of said lens. The depression molded in the planar face has a diameter of about 0.007 of an inch and of a precise depth to receive a colored substance that is preferably rubbed into the depression after the lens has been removed from the mold. A cover means such as a clear plastic coating may then be applied to the planar surface of the lens around the depression to cover its contents and protect the colored substance from deterioration or dislodgement from the depression.

Other objects of the invention will become apparent from the following specification taken in conjunction with the accompanying drawings, wherein:

FIG. 1 is a central section taken through an exemplary cavity mold used to produce the plano-convex lens of the invention.

FIG. 2 is a side elevational view of the finished lens, the muzzle end of the lens being broken away and shown in central section.

FIG. 3 is an elevational view of the lens as it would appear from the muzzle end of a firearm.

FIG. 4 is a sectional view showing the lens of FIGS. 1 and 3 mounted upon the muzzle end portion of a conventional shotgun.

FIG. 5 is an enlarged, fragmental view of a modified form of my lens, a portion thereof being shown in central section.

With particular reference to FIG. 1 of the drawings the numerals 10 and 11 indicate cooperating die parts constituting a cavity mold in which the lens 12 of this invention is made by injection. The die part 10 has a curved cavity 13 formed therein to provide the convex surface 14 on the lens while the part 11 has a blind end cavity 15 having a planar bottom surface 16 and a cylindrical side surface 17 tapered outwardly and upwardly to facilitate removal of the molded lens from the die part 11. Moldable transparent material is injected under pressure into the interior of the mold through a passage 18. It will be noted that the molded article is an elongated, plano-convex lens and that a minute, preferrably cylindrical shaped projection 19 is formed on the bottom surface 16 of the mold on the optical axis of the lens to form a depression 20 in the planar surface 21 of the lens.

Now with reference to FIGS. 2 and 3 of the drawings the depression 20 formed by the mold projection 19 in the planar surface 21 of the lens 12 has a diameter of substantially 0.007 of an inch and is of substantial depth. The next step in producing the binocular lens is to deposit a spot producing material 22 in the depression 20 filling the same to the level of the planar surface 21. The material may have an opaque, colored or translucent characteristic to provide a suitable minute image for the plano-convex lens. Thereafter a cover means such as a coating 23 of transparent material is adhered to the planar surface 21 around the rubbed in material 22 to prevent its deterioration or removal from the depression 20.

With reference to FIG. 4 it will be seen that the lens 12 is cemented in a sleeve 24, said sleeve being mounted on the rib 25 of a shotgun barrel 26 by screws 27.

It is to be noted that the molded article 12 is a plano-convex lens elongated in the direction of its optical axis that is represented in FIG. 2 of the drawings by a dot-and-dash line 28. The depression 20 preferably has a sharp cylindrical form with its center line lying in the optical axis 28 of the lens 14 and that the central bottom portion of the depression 20 is located at the principal focus or focal point of the lens. The spot producing material 22 is preferably rubbed into and fills the depression 20, the material being best protected by a transparent coating 23 adhered to the planar surface 21 of the lens around the hole 20 to cover and protect its colored contents 22.

This lens when mounted on the muzzle end of a shotgun in place of the usual bead sight with its optical axis in parallelism with the axis of the gun barrel will provide a collimated image 29 of the spot material 20 directed rearwardly to the breach end of the gun in the restricted lateral area of the aiming eye of a shooter employing binocular vision to train the gun barrel on a moving target.

A modification of my lens is shown in FIG. 5 of the drawings wherein a spot producing material 30 is disposed within the bottom portion of the depression 20 formed through the planar surface 21 and into the lens body 12. A tiny electric lamp 31 is positioned in the outer portion of the depression 20 behind the spot producing material, the lamp being secured in the lens by the transparent coating 23 cemented to the planar surface 21 of the lens. The spot producing material 30 may be a colored, translucent material or a luminescent material which provides an improved eye attractive gun sight when there is insufficient circumambient light for accurate shooting.

What is claimed is:

1. A lens for the binocular front sight of firearm barrels having a molded axially elongated plano-convex, transparent body; a minute depression molded in the lens body through the planar surface and positioned coaxially with the optical axis of the convex surface; said depression having a bottom located on the focal point of said convex surface; a spot producing material filling the depression; and a transparent cover means secured to the planar surface surrounding and enclosing said spot producing material in the depression.

2. A lens for the binocular front sight of firearm barrels as set forth in claim 1 wherein the spot producing material is a colored substance and is deposited in the depression.

3. A lens for the binocular front sight of firearm barrels as set forth in claim 2 wherein a tiny lamp is positioned in the depression behind the spot producing material, said lamp being adapted to illuminate the colored spot producing material.

4. A lens for binocular sighting as set forth in claim 1 wherein the cover means is a transparent coating adhered to the planar surface.

* * * * *